United States Patent
Lapierre-Boire

(10) Patent No.: US 11,045,987 B2
(45) Date of Patent: *Jun. 29, 2021

(54) ECONOMICAL PLASTIC TOOLING CORES FOR MOLD AND DIE SETS

(71) Applicant: A. Finkl & Sons Co., Chicago, IL (US)

(72) Inventor: Louis-Philippe Lapierre-Boire, Chicago, IL (US)

(73) Assignee: Finkl Steel, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,469

(22) Filed: Jan. 18, 2019

(65) Prior Publication Data

US 2019/0152106 A1   May 23, 2019

Related U.S. Application Data

(63) Continuation-in-part of application No. 14/998,669, filed on Feb. 1, 2016, now Pat. No. 10,239,245.

(51) Int. Cl.
| | |
|---|---|
| B29C 33/38 | (2006.01) |
| B29C 45/37 | (2006.01) |
| C21D 9/00 | (2006.01) |
| C21D 6/00 | (2006.01) |
| C22C 38/22 | (2006.01) |
| C22C 38/06 | (2006.01) |
| C22C 38/04 | (2006.01) |
| C22C 38/02 | (2006.01) |
| C22C 38/12 | (2006.01) |

(52) U.S. Cl.
CPC .............. *B29C 45/37* (2013.01); *B29C 33/38* (2013.01); *C21D 9/0068* (2013.01); *B29C 33/3842* (2013.01); *B29K 2905/00* (2013.01); *C21D 6/002* (2013.01); *C21D 6/005* (2013.01); *C21D 6/008* (2013.01); *C21D 2211/002* (2013.01); *C21D 2211/009* (2013.01); *C22C 38/02* (2013.01); *C22C 38/04* (2013.01); *C22C 38/06* (2013.01); *C22C 38/12* (2013.01); *C22C 38/22* (2013.01)

(58) Field of Classification Search
CPC ................. B29C 33/38; B29C 2045/0034
See application file for complete search history.

(56) References Cited

U.S. PATENT DOCUMENTS

| | | | | |
|---|---|---|---|---|
| 5,972,130 | A * | 10/1999 | Underys | C22C 38/44 148/332 |
| 10,239,245 | B2 * | 3/2019 | Lapierre-Boire | B29C 45/26 |
| 2003/0131911 | A1 * | 7/2003 | Grimm | C21D 1/18 148/335 |
| 2017/0217065 | A1 | 8/2017 | Lapierie-Boire | |
| 2018/0298458 | A1 * | 10/2018 | Lapierre | C22C 38/46 |

OTHER PUBLICATIONS

European Search Report related to Application No. EP 20152727.2; reported on Jun. 19, 2020.

\* cited by examiner

*Primary Examiner* — Robert B Davis
(74) *Attorney, Agent, or Firm* — von Briesen & Roper, s.c.

(57) ABSTRACT

A core side of a plastic injection molding tooling set for use in conjunction with a cavity side of the tooling set is disclosed. The core side may have the following composition in percent by weight: 0.25-0.55% carbon, 0.70-1.50% manganese, a maximum of 0.80% silicon, 1.40-2.00% chromium, 0.10-0.55% molybdenum, a maximum of 0.040% aluminum, a maximum of 0.025% phosphorous, a maximum of 0.20% sulfur, a balance of iron, and incidental impurities.

9 Claims, 2 Drawing Sheets

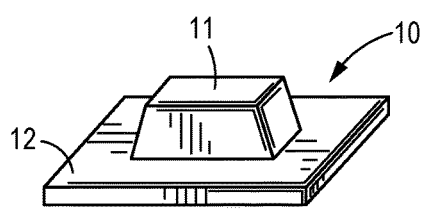
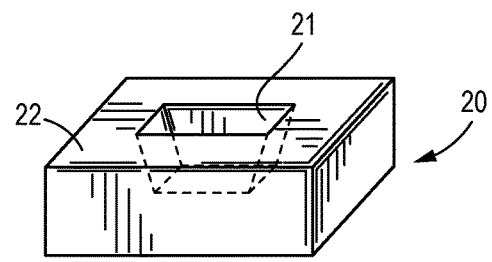
FIG. 1
FIG. 2
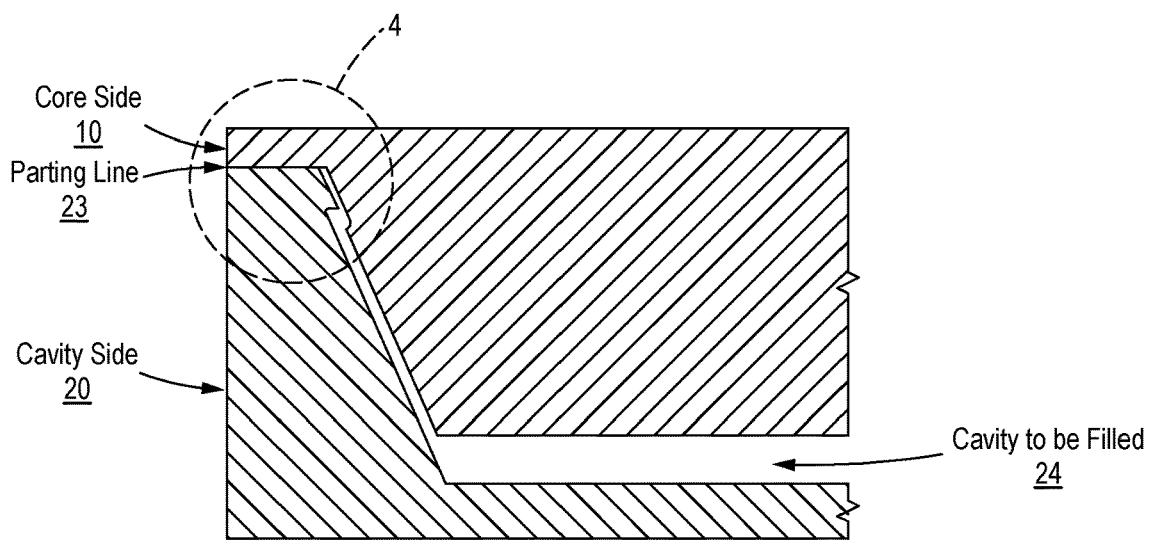
FIG. 3
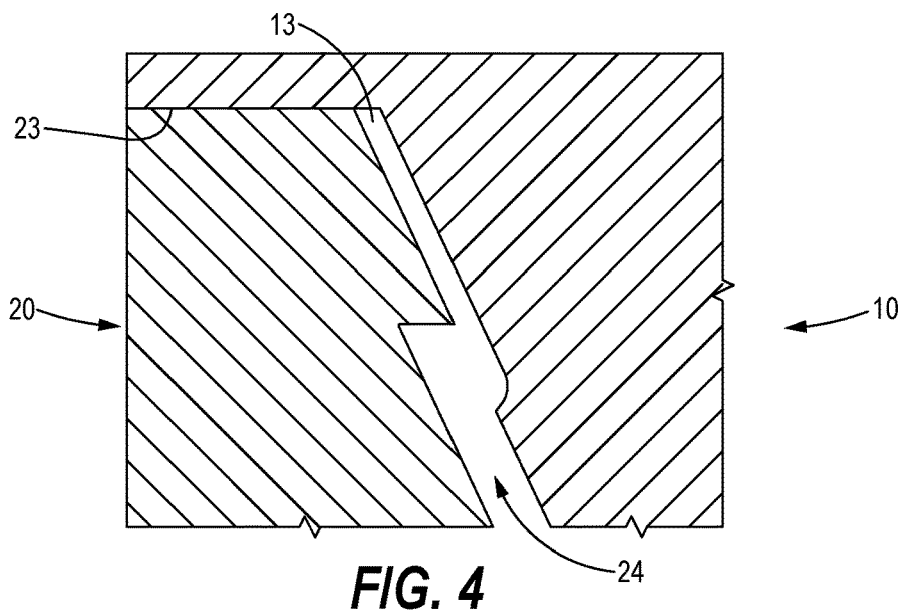
FIG. 4

ECONOMICAL PLASTIC TOOLING CORES FOR MOLD AND DIE SETS

CROSS-REFERENCE TO RELATED APPLICATION

This application is a continuation-in-part pursuant to 35 U.S.C. § 120 of U.S. patent application Ser. No. 14/998,669 filed Feb. 1, 2016.

FIELD OF THE DISCLOSURE

This invention addresses problems in the plastic tooling industry pertaining to providing blemish free surfaces on mold and die components which are in molding contact with parts which are visible to the ultimate user. This invention also addresses the continuing problem of providing mold and die materials of differing alloy compositions for the core and cavity halves for a set of plastic tooling which yield high quality final products at a very economical cost.

BACKGROUND OF THE DISCLOSURE

It has been discovered that the two halves which make up a set of plastic tooling molds or dies must have different compositions and operating characteristics to produce high quality parts at a low cost in material cross sections of about twenty inches and higher. Specifically, the cavity side of a set of plastic tooling requires, in general terms, a high quality steel to provide an ultimate blemish free surface of the molded part. By contrast, the core side of the set of tooling does not require surface finish standards as rigorous as the standards of the cavity half of the tooling set, yet must be equal to the rigorous operating conditions to which said core half is subjected.

Standard steels, such as P-20, which has the following nominal composition:

| | |
|---|---|
| C | .28-.40 |
| Mn | .60-1.00 |
| Si | .20-.80 |
| Cr | 1.40-2.00 |
| Mo | .30-.55 |
| Cu | .25 |
| P | .030 |
| S | .030 | have proven excellent in service for the cavity side of tooling sets. However, this and similar grades are uneconomical for use in the core side of tooling sets in the sense that the working attributes of such steels substantially exceed the attributes needed for the core side of tooling sets. Thus, to the part manufacturer in today's highly cost conscious environment, using the above grade for the core side of a tooling set represents an unnecessary cost over a lower cost, yet sufficiently effective alloy. As tool parts are a high cost factor to the part manufacturer, a need exists for an alloy steel for the core side of plastic molding tool sets which is less expensive than the above alloy, but which will perform quite satisfactorily when used in conjunction with the above alloy, particularly in tool sets of at least 20" in depth.

Of particular importance is that, after thousands of parts have been produced by a tooling set, the surface formed on the cavity of the tooling set should be as bright and blemish free as the parts made at the start of a campaign. However, the steel of which the core side is made need not be capable of taking as high a polish as does the cavity side since the core side is not seen. The core side does not require an aesthetically perfect finish.

It has been discovered that to preserve the parting line of the cavity side of the tooling set (that is, the line of separation between the two halves of the set), it is desirable to have a slightly lower hardness at the parting line of the core side of the set. Thus, when wear occurs, the flash created after injection of the plastic under pressure will not show on the cavity side of the tooling set.

In an attempt to address these problems a steel having the following composition has been used for the core side of the tooling set:

| | |
|---|---|
| C | .38-.43 |
| Mn | .75-1.00 |
| C | .15-.30 |
| Mo | .15-.258 |
| Cr | .80-1.10 |
| P | .035x |
| S | .040x |

However, this composition will be suitable only for cross sections of up to about 20". Above this thickness, this composition may not maintain expected mechanical properties in depth. Specifically, at thicknesses larger than 20", this steel exhibits too much hardness drop at parting lines. This may be attributable to the mass effect upon quenching pieces over 20".

Thus, for core block steels in sections of 20" and larger in plastic injection molding tooling, a new composition is needed for the core side of plastic tooling sets which will have all the physical and mechanical properties needed for 20" and larger mold and die tooling sets but at a lower cost than materials currently available.

SUMMARY OF THE DISCLOSURE

In accordance with one aspect of the present disclosure, a set of plastic injection steel tooling having a core side and a cavity side is disclosed. The core side of the set may have the following composition in percent by weight: 0.25-0.55% carbon, 0.70-1.50% manganese, a maximum of 0.80% silicon, 1.40-2.00% chromium, 0.10-0.55% molybdenum, a maximum of 0.040% aluminum, a maximum of 0.025% phosphorous, a maximum of 0.20% sulfur, a balance of iron, and incidental impurities.

In accordance with another aspect of the present disclosure, a core side of a plastic injection molding tooling set for use in conjuction with a cavity side of the tooling set is disclosed. The core side may have the following composition in percent by weight: 0.25-0.55% carbon, 0.70-1.50% manganese, a maximum of 0.80% silicon, 1.40-2.00% chromium, 0.10-0.55% molybdenum, a maximum of 0.040% aluminum, a maximum of 0.025% phosphorous, a maximum of 0.20% sulfur, a balance of iron, and incidental impurities.

These and other aspects and features of the present disclosure will be more readily understood when read in conjunction with the accompanying drawings.

BRIEF DESCRIPTION OF THE DRAWINGS

FIG. 1 is a perspective view of the core side of a set of plastic tooling;

FIG. 2 is a perspective view of the cavity side of said set of plastic tooling;

FIG. 3 is a cross-sectional view of portion of a simplified mold set;

FIG. 4 is an expanded view of detail 4 of FIG. 3; and

DETAILED DESCRIPTION OF THE DISCLOSURE

Figure 5:
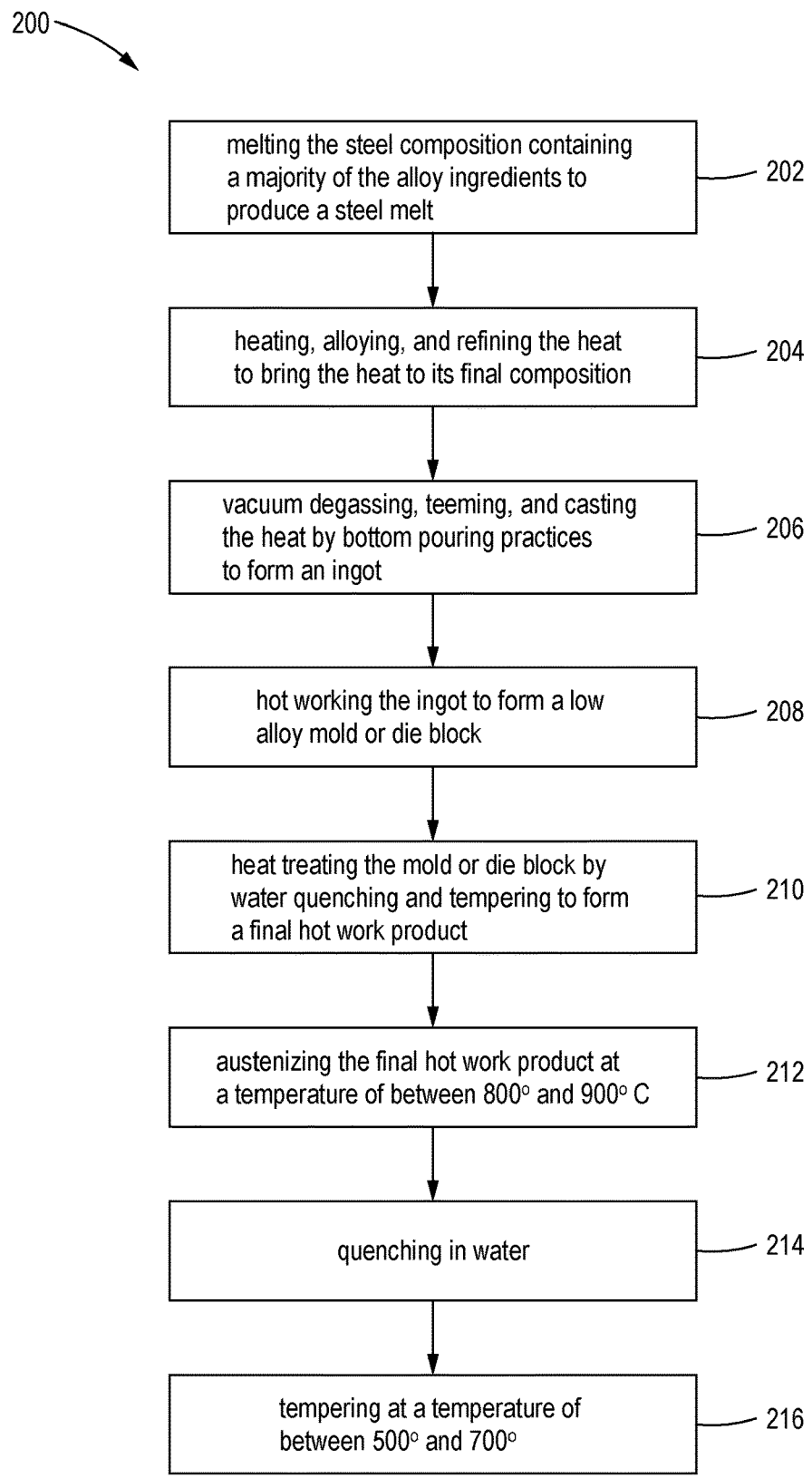
FIG. 5 is a flowchart of a series of steps that may be involved in manufacturing the core side of the set of plastic tooling.

Referring first to FIG. 1, the core side of a plastic tooling set is indicated generally at 10, the core at 11 and the parting line plane at 12.

Referring next to FIG. 2, the cavity side of a plastic tooling set is indicated generally at 20, the cavity at 21 and the parting line plane at 22. It will be understood that when the core side 10 and the cavity side 20 are in molding engagement the parting line planes 12 and 22 will be in abutting engagement to form a parting line 23 (see FIG. 3), and the core side 11 will be received in the cavity 21.

Since the dimensions of the core 11 are slightly smaller than the dimensions of the cavity 21, a part will be formed in the space 24 between the core and the cavity (see FIG. 4). The two halves 10 and 20 will of course be held in fixed positions when closed by suitable means well known in the industry, not shown.

Referring now specifically to FIG. 4, it will be seen that the parting line 23 forms a clear line of demarcation when the surface of the core side 10 and the surface of the cavity side 20 are in contact. When shots of molten plastic under considerable pressure are injected into the mold cavity 24, said plastic will come into contact with the surfaces of both the core side 10 and the cavity side 20. However, since the core side 10 is formed from a steel which is softer than the steel of cavity side 20, said core side 10 will erode in preference to the cavity side 20. In the illustrated embodiment the eroded area in core side 10 is indicated at 13 in FIG. 4. Although the Figure indicates a uniform depth of erosion, it will be understood that some locations may be softer than adjacent locations and hence the eroded space will be of irregular depth from point to point. However, the steel from which core side 10 is formed is always softer than the steel from which cavity side 20 is formed and hence more erodible than the cavity steel. As a result, the core side will always contain whatever flash may result after many cycles. However, since the core side surface of the molded part is not visible to the observer, the flash represented by area 13 of core side 10 is acceptable commercially.

Referring now to the core 10 only, said core of this invention is formed from steel having the following broad composition in percent by weight:

| | |
|---|---|
| Carbon | .25-.55% |
| Manganese | .70-1.50% |
| Silicon | 0.80% max. |
| Chromium | 1.40-2.00% |
| Molybdenum | .10-.55% |
| Aluminum | .040% max. |
| Phosphorous | .025% max. |
| Sulfur | .20% max. |
| Iron | balance and incidental impurities. |

Within the above range, the composition of the core 10 in percent by weight may be the following:

| | |
|---|---|
| Carbon | .30-.50% |
| Manganese | 1.05-1.45% |
| Silicon | 0.60% max. |
| Chromium | 1.50-2.00% |
| Molybdenum | .10-.45% |
| Aluminum | .035% max. |
| Phosphorous | .020% max. |
| Sulfur | .05-.15% |
| Iron | balance and incidental impurities. |

Within the above ranges, the composition of the core 10 in percent by weight may be the following:

| | |
|---|---|
| Carbon | .30-.45% |
| Manganese | 1.15-1.35% |
| Silicon | 0.40% max. |
| Chromium | 1.50-1.90% |
| Molybdenum | .10-.30% |
| Aluminum | .030% max. |
| Phosphorous | .015% max. |
| Sulfur | .05-.10% |
| Iron | balance and incidental impurities. |

Carbon is necessary to provide the required hardness and wear resistance. If carbon is significantly higher than 0.55% by weight, the mold block will exhibit low machinability and polishing characteristics. Preferably, a maximum of 0.50% by weight carbon is used to ensure good machinability. If substantially less than 0.25% by weight carbon is used, wear resistance and mechanical properties will not be suitable for service conditions to which the mold blocks are subjected. Preferably, a minimum of 0.30% by weight carbon is used to ensure acceptable wear resistance, hardness and mechanical properties. Most preferably, carbon in the range of 0.35% to 0.45% by weight with an aim of 0.40% should be used.

Manganese is essential for hardenability and as a deoxidizer in the steelmaking process. It also acts to control sulphides in forging operations. In combination with the other alloying elements, if significantly higher than 1.50% by weight is present, there is a risk that retained austenite will be present. If substantially less than 0.70% by weight manganese is present, the hardenability of the mold block will be lessened. In addition, to ensure sulfur control, the manganese content should be present in an amount of at least 20 times the sulfur content. Manganese also contributes to wear resistance, although to a lesser extent than other carbide formers. Preferably manganese will be present in the range of 1.05% to 1.45% by weight, and most preferably from 1.15% to 1.35% by weight.

Silicon specified for its deoxidizing ability in the steelmaking process. If present in substantially greater quantities than specified, there will be a predisposition towards embrittlement of the final product.

Chromium is necessary for carbide formation, for hardenability and for wear resistance. If substantially more than the maximum of 2.00% by weight chromium is present, the hardening temperature would be too high for normal production heat treatment process. Below the specified minimum of 1.40% by weight chromium, the wear resistance will be negatively affected. Preferably, chromium is present in the amount of 1.50% to 2.00% by weight, and most preferably from 1.50% to 1.90% by weight.

Molybdenum is a key element contributing to hardenability and wear resistance by the fact that it is a strong carbide former. It is beneficial effects are effective in the range of 0.10% to 0.55% by weight, but preferably it is maintained in the lower band of the range from 0.10% to 0.45% by weight, and most preferably in the range of 0.10% to 0.30% by weight.

Aluminum is desirable for grain refinement but can have a detrimental effect on steel quality by causing the presence of aluminates, an undesirable impurity. It is therefore important to minimize the addition of aluminum to a maximum of 0.040% by weight in the final melt composition. Most preferably an aim of 0.020% by weight aluminum will achieve grain refinement.

Phosphorus could increase machinability but the detrimental effects of this element in tool steels, such as an increase in ductile-brittle transition temperature, outweigh any beneficial effects. Accordingly, the phosphorus content should not be more than the specified maximum of 0.025% by weight, and most preferably lower than 0.015% by weight.

Sulfur is a key element for machinability and it is commonly believed that a content higher than 0.045% in tool steel will result in acceptable machinability. However, to maintain control of sulfides during processing will be necessary to avoid a content over 0.20% by weight sulfur. Sulfur should be present in the amount of 0.05% to 0.15% by weight, and most preferably in the range of 0.05% to 0.10% by weight, with an aim of 0.07% by weight.

It is essential that the final composition be water quenched in order to achieve the required operating characteristics. However, the core and cavity sections must be produced to dissimilar hardness in order to ensure that the core side of the tooling set will have a lower hardness than the cavity side.

Thus, a suitable hardness range for the cavity side would be 277-321 BHN, and a suitable hardness range for the core side would be 269-277 BHN, providing that the hardness of the core side is always lower than the hardness of the cavity side. By maintaining a differential hardness between the two halves with the core half being softer than the cavity half, the parting line of the cavity is preserved; that is, the wear of the parting line of the core side is favored instead of the parting line of the cavity side. As a consequence, the bright, unblemished surface of the cavity side will be reflected in the final molded part so that minimal, or no, post molding processing of the cavity side of the part will be required.

Referring now to FIG. 5, a method of manufacturing the low alloy steel blocks for the core side of molds or dies of thickness 20 inches and larger is as follows:

A melt of steel is prepared in an electric arc furnace by:
a. melting the bulk of the steel composition containing a majority of the alloy ingredients to produce a steel melt suitable for tapping into a receptacle (block 202),
b. thereafter heating, alloying and refining the heat to bring the heat to its final composition (block 204),
c. vacuum degassing, teeming and casting the gear by bottom pouring practices to form ingots (block 206),
d. hot working the ingots to form a low alloy mold or die block (block 208), and
e. thereafter heat treating the mold or die block by water quenching and tempering to form a hot work product (block 210).

It will be understood that after processing the steel in the manner described above, the hot worked product should be subjected to austenitizing at a temperature of between 800° and 900° C. (block 212), quenching in water (block 214), and tempering at a temperature of between 500° and 700° C. (block 216).

Following said treatment, the resultant product will exhibit a microstructure comprising mostly bainite and possibly a mixture of bainite and perlite which will be deeper than ¼ of the thickness of the block.

What is claimed is:

1. A set of plastic injection steel tooling having a core side and a cavity side, the core side being formed from a steel that is softer than a steel forming the cavity side, the core side of the set having the following composition in percent by weight:

| | |
|---|---|
| C | .25-.55%, |
| Mn | .70 to less than 1.30%, |
| Si | 0.80% max., |
| Cr | 1.40-2.00%, |
| Mo | .10-.55%, |
| Al | .040% max., |
| P | .025% max., |
| S | .20% max., and |
| Fe | balance and incidental impurities. |

2. The set of plastic injection steel tooling of claim 1, wherein the core side of the set has the following composition in percent by weight:

| | |
|---|---|
| C | .30-.50%, |
| Mn | 1.05 to less than 1.30%, |
| Si | 0.60% max., |
| Cr | 1.50-2.00%, |
| Mo | .10-.45% max., |
| Al | .035% max., |
| P | .020% max., |
| S | .05-.15%, and |
| Fe | balance and incidental impurities. |

3. The set of plastic injection steel tooling of claim 1, wherein the core side of the set has the following composition in percent by weight:

| | |
|---|---|
| C | .35-.45%, |
| Mn | 1.15 to less than 1.30%, |
| Si | 0.40% max., |
| Cr | 1.50-1.90%, |
| Mo | .10-.30%, |
| Al | .030% max., |
| P | .015% max., |
| S | .05-.10%, and |
| Fe | balance and incidental impurities. |

4. A core side of a plastic injection molding tooling set for use in conjunction with a cavity side of the tooling set, the core side being formed from a steel that is softer than a steel forming the cavity side, the core side having the following composition in percent by weight:

| | |
|---|---|
| C | .25-.55%, |
| Mn | .70 to less than 1.30%, |
| Si | 0.80% max., |
| Cr | 1.40-2.00%, |
| Mo | .10-.55%, |
| Al | greater than 0.0% and less than .040% max., |
| P | .025% max., |
| S | .20% max., and |
| Fe | balance and incidental impurities. |

5. The core side of a plastic injection molding tooling set of claim 4, wherein the core side has the following composition in percent by weight:

| | |
|---|---|
| C | .30-.50%, |
| Mn | 1.05 to less than 1.30%, |
| Si | 0.60% max., |
| Cr | 1.50-2.00%, |
| Mo | .10-.45%, |
| Al | greater than 0.0% and less than .035% max., |
| P | .020% max., |
| S | .05-.15%, and |
| Fe | balance and incidental impurities. |

6. The core side of a plastic injection molding tooling set of claim 5, wherein the core side has the following composition in percent by weight:

| | |
|---|---|
| C | .35-.45%, |
| Mn | 1.15 to less than 1.30%, |
| Si | 0.40% max., |
| Cr | 1.50-1.90%, |
| Mo | .10-.30%, |
| Al | greater than 0.0% and less than .030% max., |
| P | .015% max., |
| S | .05-.10%, and |
| Fe | balance and incidental impurities. |

7. The core side of a plastic injection molding tooling set of claim 4, wherein the core side is at least 20" in depth.

8. The core side of a plastic injection molding tooling set of claim 7, wherein the core side is prepared from a melt of steel prepared in an electric arc furnace by:
   a. melting the bulk of the steel composition containing the majority of the alloy ingredients to produce a steel melt suitable for tapping into a receptacle,
   b. thereafter tapping, heating, alloying and refining the heat to bring the heat to its final composition,
   c. vacuum degassing, teeming and casting the heat by bottom pouring practices to form an ingot,
   d. hot working the ingot to form a low alloy mold or die block, and
   e. thereafter heat treating the mold or die block by water quenching and tempering to form a final hot work product.

9. The core side of a plastic injection molding tooling set of claim 8, wherein the final hot work product is subsequently subjected to:
   austenitizing at a temperature of between 800° and 900° C.,
   quenching in water, and
   tempering at a temperature of between 500° and 700° C. to form a microstructure consisting mostly of bainite or a mixture of bainite and perlite which will be deeper than ¼ of the thickness of the block from which said core side is formed.

\* \* \* \* \*